June 20, 1950 A. L. LANGEL 2,512,064
PAN COVER
Filed Jan. 24, 1947 3 Sheets-Sheet 1
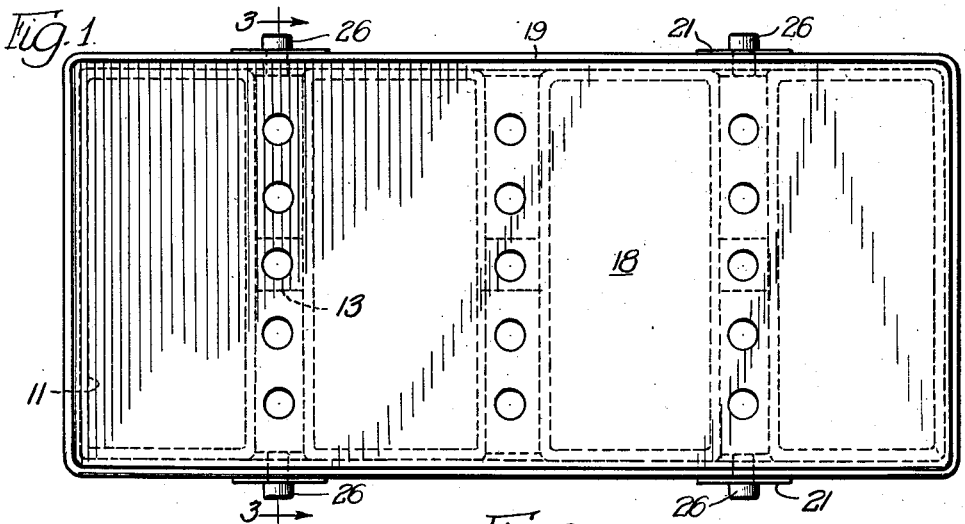
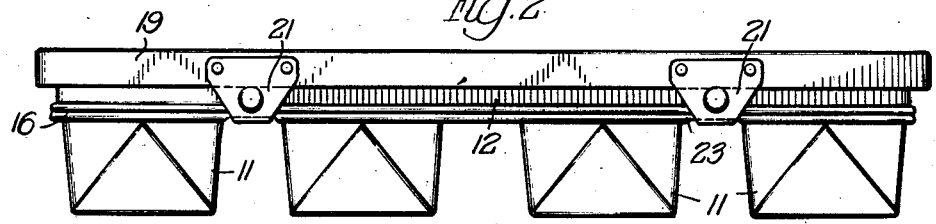
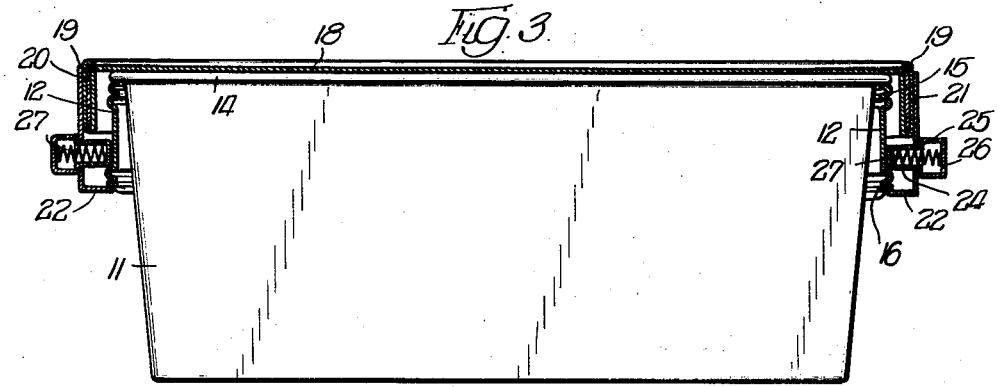
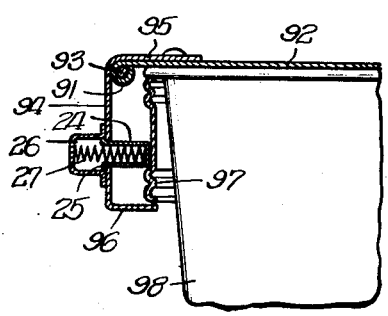
INVENTOR.
Adrien L. Langel,
BY June 20, 1950 — A. L. LANGEL — 2,512,064
PAN COVER
Filed Jan. 24, 1947 — 3 Sheets-Sheet 2
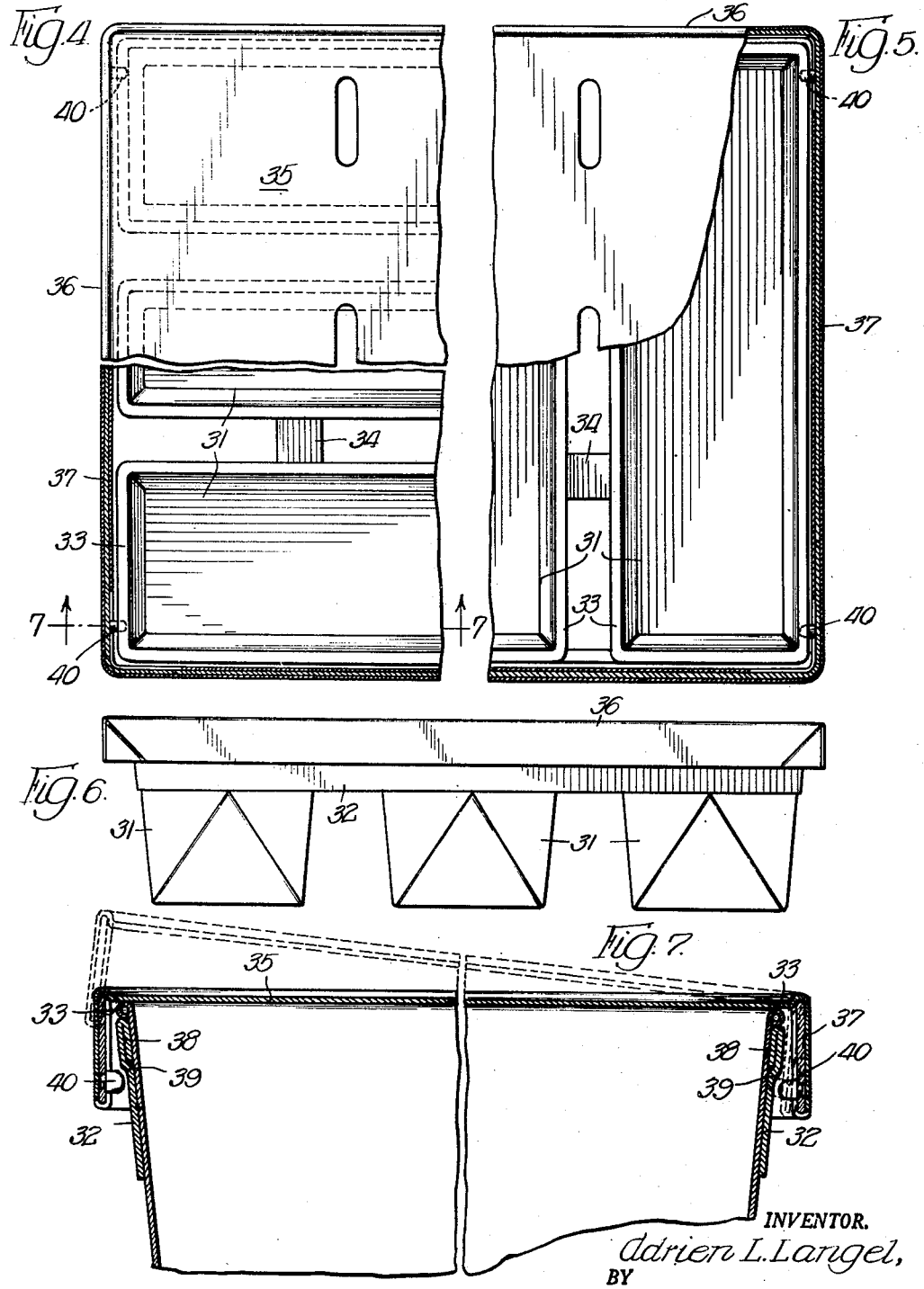

June 20, 1950  A. L. LANGEL  2,512,064
PAN COVER
Filed Jan. 24, 1947  3 Sheets-Sheet 3
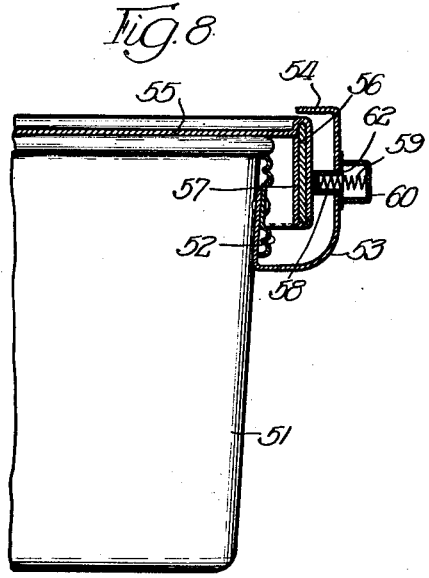
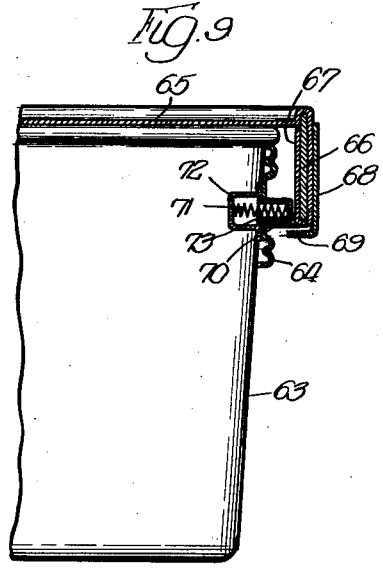
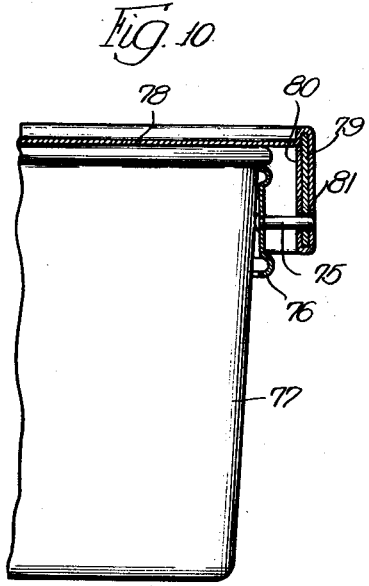
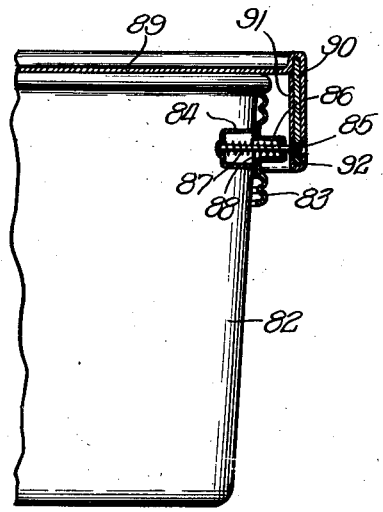
INVENTOR.
Adrien L. Langel,
BY Patented June 20, 1950

2,512,064

UNITED STATES PATENT OFFICE 2,512,064

PAN COVER

Adrien L. Langel, Chicago, Ill., assignor to Chicago Metallic Manufacturing Company, Chicago, Ill., a corporation of Illinois Application January 24, 1947, Serial No. 723,977

3 Claims. (Cl. 220—55)

This invention relates to a new and improved pan cover and more particularly to a cover for baking pans.

While the improved cover is adapted for use with any type of pan, it is particularly adapted for use with multiple unit pans such as employed by commercial bakers for baking a plurality of loaves of bread in a single pan unit. Such covers are used for various purposes, as for example to flatten the top surface of the loaves during baking by holding rise of the bread to the size of the pan so as to make square sandwich loaves. They are also used in some cases merely as a protection to the filled pans before, during and after baking and to facilitate stacking of filled pans.

Such covers have heretofore been generally made of heavy sheet metal or have been weighted with heavy circumferential side bands or heavy top plates or held down by clamps so as to maintain their position against the force of the bread which rises during the baking process and to eliminate the possibility of the cover coming off the set for any reason. Such heavy or clamping covers are expensive and also required greater labor in handling them than is the case with regular tight covers. Also, there is a tendency for such covers to be accidentally lifted off or slipped off in use. This accidental displacement of the covers may cause loss or damage to the bread. In addition, it may cause jams and mechanical damage when the pans are used in ovens provided with mechanical conveyors or other automatic means for moving the pans.

It is an object of the present invention to provide a new and improved pan cover having means for securing it upon a pan without the use of a manual clamping device.

It is also an object to provide a cover of this character which may be readily fitted upon a pan or removed therefrom.

It is another object to provide a cover having means for securing it in place upon a standard type of pan without the addition of securing element to the pan by the use of a spring centering device.

It is an additional object to provide a pan cover provided with securing means actuatable by manipulation of the cover without separate manipulation of the several securing means.

It is a further object to provide a cover with attached securing means which are simple in design and construction and easily cleaned.

Other and further objects will appear as the description proceeds.

I have shown certain preferred embodiments of my invention in the accompanying drawings, in which—

Figure 1 is a plan view of one form of construction applied to a multiple baking pan;

Figure 2 is a side elevation of the construction of Figure 1;

Figure 3 is a section taken on line 3—3 of Figure 1;

Figure 4 is a partial plan view, partly in section and partly broken away, showing a modified form of construction;

Figure 5 is a view, similar to Figure 4, showing a further modified form;

Figure 6 is a side elevation of the construction of Figure 5;

Figure 7 is a fragmentary section taken on line 7—7 of Figure 4;

Figure 8 is a fragmentary section showing a modified form of construction having the spacing and securing means carried by the pan assembly;

Figures 9, 10 and 11 are views, similar to Figure 8, showing modified forms of spacing and securing means carried by the cover; and Figure 12 is a view similar to Figure 8 showing a modified form of spacing and securing means carried by a flat cover.

Referring first to the form of construction shown in Figures 1 to 3 inclusive, the pan assembly comprises a plurality of separate loaf-containing units 11 which are held together by a peripheral band or strap 12. As shown in broken lines in Figure 1, these pan units 11 are held in spaced relationship within the strap 12 by means of the spacing members 13. The strap 12 is shown as fitting under beads 14 around the top of the pan units 11. The strap 12 itself is shown with beading 15 adjacent its upper edge and the bead 16 adjacent its lower edge. It will be understood that the pan and strap assembly is permanently joined together and is a substantially rigid structure. The particular construction of the pan assembly forms no part of the present invention and need not be further described.

The cover which constitutes the present invention comprises a top member 18 and a downwardly extending peripheral flange 19. As shown, this flange 19 consists in a portion of the top member 18 which is folded around a circumferentially extending band or strap 20. The peripheral flange 19 carries spacing and securing means 21 upon opposed sides thereof. As shown in section in Figure 3, these spacing and securing members 21 extend downwardly beyond the strap 12 and have inturned ends 22 forming lugs adapted to fit below the underside of the strap 12. In the form of construction shown in the drawings, the strap 12 has its lower edge indented or formed upwardly at 23 to receive the inwardly extending flange 22.

The members 21 carry the yielding centering means, each of which comprises a spring pressed cup 24 which extends inwardly from the cover flange 21, this cup being provided with a circumferential rim 25 which engages the outer face of member 21 and limits movement of the cup inwardly of flange 21. The rear of the cup is covered by the small housing 26 which is secured in place on the outer face of member 21 and serves as an outer abutment for the coil-compression spring 27.

It will be noted that the distance between the opposite inner faces of the peripheral flange 19 of the cover is substantially greater than the corresponding outside dimension of the pan upon which it fits. The inwardly extending securing portions or lugs 22 have their inner edges spaced apart a distance less than the overall width of the strap 12 carried by the pan assembly. Thus, when the cover is centered on the pan it is positively held against upward movement by these lugs 22. The depth of the cups 24 is so proportioned relative to the inward extension of the lugs 22 and also relative to the dimensions of the pan and the cover flange that the cover is held centered on the pan, as clearly shown in Figure 3.

The method of removal of the cover will be apparent from inspection of the drawings. For example, in Figure 3, if the cover is moved to the right relative to the pan the spring 27 in the left centering means will be compressed and the lug 22 will move under the strap 12. This will cause the cup 24 on the right to clear the strap 12 and the lug 22 to be free of the lower edge of the strap 12. The right edge of the cover may then be swung upwardly about the left lower edge as an axis and, when the lug portion 22 clears the top of the pan, the cover may be slid to the left so that the lefthand side of the cover clears the pan assembly. The cover may be then fully removed from the pan either by lifting or by sliding further to the left. The pan cover is replaced by the reversal of the movements just described. Since the cover is symmetrical, it will be apparent that it may be applied or removed from either side with equal facility.

The forms of construction shown in Figures 4 to 7 inclusive differ in structure, though not in principle, from the construction just described. This assembly of pans 31 is held together by a circumferential strap 32, the pans 31 having beads 33 fitting over the top of the strap. The pan elements 31 are held spaced in the strap by the separating members 34. The cover has a top member 35 having its edges 36 folded around a circumferentially extending strap 37. The upper edges of the pan assembly strap 32 are shown as folded upon themselves at 38, forming a shoulder 39.

The circumferential strap 37 of the cover is provided with inwardly extending rounded lugs 40 which are adapted to engage under the shoulder 39 on strap 32. In the form of construction shown in Figure 4 the lugs 40 are on the side of the cover adjacent the ends of the separate pan members 31. In the form of construction shown in Figure 5 the lugs 40 are on the portions of the cover flange which are opposite the ends of the pan assembly or the sides of the end load sections or pans 31. It will be apparent that the construction will operate equally well in either relationship.

The inner faces of the opposed lugs 40, as best shown in Figure 7, are spaced apart a distance less than the overall dimension of the pan beads 33 and shoulder 39 on strap 32. Thus, when the pan cover is centered upon the pan it is held against direct upward removal by the engagement of lugs 40 with the shoulder 39. It may be removed, however, by being slid laterally so that the lugs 40 on one side engage the face of strap 32 after which the opposite edge is lifted, as shown in broken lines in Figure 7, until the cover clears the top of the pan structure.

In the form of construction shown in Figure 8, the pan assembly 51 is provided with the strap 52 under which are secured the spaced hook-shaped securing members 53. The free end of each member 52 comprises a horizontal retaining portion 54 which overlies the edge of the cover 55. The cover includes the circumferential flange comprising the band iron 56 with the cover portion extending around it at 57. The cup 58 extends through member 53 and is urged inwardly by spring 59 retained in place by cap 60. Inward movement of the cup 61 is limited by its flange 62.

It will be apparent that in the construction of Figure 8, the cover is centered by pressure of springs 59 so that it is held against upward displacement by the portions 54 of the retaining strap 52. There is sufficient clearance between the inner face portion 57 of the cover flange and the pan strap 52 so that the cover may be moved laterally so that it clears one of the portions 54. That side of the cover is then lifted clear of the portion 54 after which the cover is slid laterally toward the lifted edge so that its opposite edge clears the adjacent retaining portion 54. The cover may then be lifted clear of the pan. The cover is applied to the pan by a reversal of these movements.

The construction shown in Figure 9 comprises the pan assembly 63 having the circumferential strap 64. The edges of the cover 65 extend around the band iron 66, having a portion 67 lying against the inner face of the band iron. The retaining member 68 is welded or riveted to the outer face of the lateral flange of the cover and has an inwardly extending retaining portion 69. The spring pressed cup 70 is urged inwardly from the band iron by the spring 71 which is retained in place by the cap 72. The inward movement of the cup 70 is limited by its base flange 73. It will be understood that these assemblies are located between the separate pan units so that the cap 72 is located between the pans. The retaining member 69 extends below the spring pressed cup 70. There is adequate clearance between the inner edge of the retaining portion 69 and the strap 64 so that the cover may be moved laterally sufficiently so that the retaining portion or portions 69 on that side of the cover which moves away from the pan assembly will clear the outer end of the cup or cups 70 and permit that side of the cover to be swung upwardly until it clears the top of the pan assembly. The cover may then be moved laterally in the opposite direction to clear it entirely from the pan assembly.

The form of construction shown in Figure 10 is generally similar to that shown in Figures 1 to 3, with the exception that the securing pin 75 is carried by the strap 76 on the pan assembly 77 rather than being carried on the cover. The cover 78 is provided with the band iron 79, about which the edges of the cover are wrapped and extended at 80 on its inner face. The entire flange, including the band iron and cover edge, is perforated as shown at 81 to receive the retaining pin 75. There is sufficient clearance between the inner face 80 of the flange and pan strap 76 so that the cover may be moved laterally to clear the pin or pins 75 on one side from the associated perforations 81. That side may then be lifted clear of the pan and the cover slid laterally to clear the opposite flange from its pin or pins 75.

The construction of Figure 11 combines the pins carried by the pan flange with spring pressed spacing means. The pan assembly 82 is provided with the circumferential flange 83. This flange 83 carries cap members 84 located between the pan units. The locking pins 85 are secured fixedly in the bases of the caps 84. The spacing cups 86 are urged outwardly of the strap 83 by springs 87 which surround the pin 85. The outward movement of the cups 86 is limited by the base flanges 88. The cover 89 has its lateral edges wrapped around the band iron 90 extending up around its inner face at 91. The entire pan flange is provided with the perforations 92 to receive the retaining pins 85. This cover is removed by the same series of movements as described in connection with Figure 10. The additional feature is that the lateral movement is resisted by spring pressure so that the springs normally maintain the cover centered on the pan and prevent accidental lateral displacement sufficient to free the pins from the perforations in the cover flange.

The form of construction of Figure 12 is similar to that of Figure 3 insofar as the centering and securing means are shown, but the cover is provided with an edge formed by wrapping the edge 91 of the cover member 92 around a circumferential wire 93 rather than having the deeper depending flange 19 of Figure 3. In Figure 12 the securing member 94 is U-shaped, having a longer leg 95 riveted or otherwise secured to the cover 92. The member 94 has a shorter inturned leg 96 engaging under the circumferential strap 97 of the pan 98.

The yielding centering means of Figure 12 is identical with that of Figure 3, comprising the spring pressed cup 24 provided with the rim 25 which engages the outer face of member 94 and limits the inward movement of the cup. The rear of the cup 24 is covered by housing 26 which serves as an outer abutment for the compression spring 27. This form of construction is placed upon the pan and removed therefrom in the same manner as the construction of Figure 3.

In any of the forms shown, the cover may be thrust laterally while the pan and cover assembly are on a horizontal surface and the cover may be quickly removed. In many normal handling operations of such pans to remove the baked loaves the pans are tilted, one side being swung upwardly a substantial distance above the other side. In all constructions shown except that of Figure 8, the weight of the cover will cause it to slide downwardly so that the securing means on the lower edge will be in position to clear the pan strap. Where the construction of Figures 1 to 3 inclusive, 9, 11 or 12 is used, the weight of the cover will compress the springs. It is then only necessary to swing the lower edge of the cover upwardly to remove it from the pan assembly and permit dumping of the loaves.

Where the spacing and securing members are carried by the cover flange, they may be secured thereto by rivets or spot welding which will also secure the cover edges to the band iron.

The constructions shown are simple and effective in use and may readily be kept clean as they offer no pockets to accumulate foreign matter. The covers may be stacked and handle easily since they have no projecting operating members. The clamping and securing of the cover in place, or its removal, necessitates no latching or unlatching operation independently of the removal of the cover. The covers will be held in place effectively against any lifting by the rising of the bread contained in the pans and against any slipping of the cover off the set for any reason. Because of the securing means provided, the covers may be made of much lighter material than is customary with loose covers since the weight of the cover is not a controlling factor in holding it in place.

While I have shown certain preferred embodiments of my invention, these are to be understood as illustrative only as it is capable of variation to meet differing conditions and requirements, and I contemplate such modifications as come within the spirit and scope of the appended claims.

I claim:

1. A pan cover comprising a rectangular top member, a downwardly extending peripheral flange carried by the top member, inwardly extending spacing and securing means carried by the flange, and yielding means carried by and extending inwardly of the flange and adapted to engage a lateral portion of a pan structure, said yielding means comprising a spring enclosed by a cup-shaped member, said member having laterally extending means limiting its movement inwardly of the flange.

2. In combination with a rectangular pan structure having a projecting member along two or more opposed upper edges, a cover having a top portion and a downwardly extending peripheral flange, the top portion resting upon the pan top and the flange being located adjacent and spaced from the projecting member, spacing and securing means extending inwardly from the flange adjacent and below opposed portions of the pan projecting member, said spacing and securing means extending inwardly opposite each other from opposed portions of the flange and being spaced apart a distance less than the distance across the pan between the outer faces of the corresponding opposed portions of the pan projecting member, the corresponding distance between inner faces of the cover flange being such that the cover may be placed upon the pan and removed therefrom by a combined lateral and tilting movement, and yielding centering means extending inwardly from the cover flange and engaging the pan structure to center the cover on the pan.

3. In combination with a rectangular pan structure having a projecting member along two or more opposed upper edges, a cover having a top portion and a downwardly extending peripheral flange, the top portion resting upon the pan top and the flange being located adjacent and spaced from the projecting member, spacing and securing means extending inwardly from the flange adjacent and below opposed portions of the pan projecting member, said spacing and securing means extending inwardly opposite each other from opposed portions of the flange and being spaced apart a distance less than the distance across the pan between the outer faces of the corresponding opposed portions of the pan projecting member, the corresponding distance between inner faces of the cover flange being such that the cover may be placed upon the pan and removed therefrom by a combined lateral and tilting movement, and yielding centering means comprising spring pressed cup-shaped members extending inwardly from the cover flange, said cup-shaped members having means to limit their inward movement from the inner flange face whereby they engage the pan structure and center the cover thereon.

ADRIEN L. LANGEL.

REFERENCES CITED

The following references are of record in the file of this patent:

UNITED STATES PATENTS

| Number | Name | Date |
| --- | --- | --- |
| 288,097 | Morrison | Nov. 6, 1883 |
| 596,058 | Davis | Dec. 28, 1897 |
| 1,050,449 | Gillespie | Feb. 14, 1913 |
| 2,082,973 | Prabell | June 8, 1937 |
| 2,315,455 | Sale | Mar. 30, 1943 |
| 2,436,097 | Clarke | Feb. 17, 1948 |

FOREIGN PATENTS

| Number | Country | Date |
| --- | --- | --- |
| 1,617 | Italy | Sept. 21, 1889 |
| 20,541 | Germany | Dec. 18, 1882 |

Certificate of Correction

Patent No. 2,512,064

June 20, 1950

ADRIEN L. LANGEL

It is hereby certified that error appears in the printed specification of the above numbered patent requiring correction as follows:

Column 1, line 26, for the word "tight" read *light*;

and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*